US010020016B2

(12) United States Patent
Uchida et al.

(10) Patent No.: US 10,020,016 B2
(45) Date of Patent: Jul. 10, 2018

(54) PERPENDICULAR MAGNETIC RECORDING MEDIUM

(71) Applicant: Fuji Electric Co., Ltd., Kawasaki-shi (JP)

(72) Inventors: Shinji Uchida, Matsumoto (JP); Takehito Shimatsu, Sendai (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 0 days.

(21) Appl. No.: 15/035,670

(22) PCT Filed: Dec. 2, 2014

(86) PCT No.: PCT/JP2014/006030
§ 371 (c)(1),
(2) Date: May 10, 2016

(87) PCT Pub. No.: WO2015/087510
PCT Pub. Date: Jun. 18, 2015

(65) Prior Publication Data
US 2016/0293198 A1    Oct. 6, 2016

(30) Foreign Application Priority Data

Dec. 10, 2013   (JP) ................... 2013-255038

(51) Int. Cl.
*G11B 5/66* (2006.01)
*G11B 5/65* (2006.01)
(Continued)

(52) U.S. Cl.
CPC .................. *G11B 5/66* (2013.01); *G11B 5/65* (2013.01); *G11B 5/653* (2013.01); *G11B 5/656* (2013.01); *G11B 5/667* (2013.01); *G11B 5/82* (2013.01)

(58) Field of Classification Search
None
See application file for complete search history.

(56) References Cited

U.S. PATENT DOCUMENTS 7,128,987 B2 * 10/2006 van de Veerdonk ..... G11B 5/66
  204/192.2
8,241,766 B2 *  8/2012 Lu .......................... G11B 5/314
  360/131
(Continued)

FOREIGN PATENT DOCUMENTS

JP    2001-291230 A    10/2001
JP    2004-178753 A     6/2004
(Continued)

OTHER PUBLICATIONS

Derwent Abstract Translation of WO 2014/087568 A1 (pub. 2014).*
(Continued)

*Primary Examiner* — Kevin M Bernatz
(74) *Attorney, Agent, or Firm* — Venable LLP; Michael A. Sartori; Kerri M. Patterson

(57) ABSTRACT

A magnetic recording medium including a magnetic recording layer of a granular structure and having a large thickness as well as excellent magnetic properties is provided. The perpendicular magnetic recording medium includes a non-magnetic substrate and a magnetic recording layer, wherein the magnetic recording layer includes first magnetic recording layers on the side of the non-magnetic substrate and second magnetic recording layers, the first magnetic layers have a granular structure including first magnetic crystal grains containing an ordered alloy and a first non-magnetic segregant surrounding the first magnetic crystal grains and containing carbon; and the second magnetic layers have a granular structure including second magnetic crystal grains containing an ordered alloy and a second non-magnetic
(Continued)

segregant surrounding the second magnetic crystal grains and containing Zn and O.

11 Claims, 17 Drawing Sheets

(51) Int. Cl.
*G11B 5/667* (2006.01)
*G11B 5/82* (2006.01)

(56) References Cited

U.S. PATENT DOCUMENTS

| | | | | |
|---|---|---|---|---|
| 8,268,462 B2* | 9/2012 | Peng | ...................... | B82Y 10/00 428/836.2 |
| 8,460,805 B1* | 6/2013 | Gao | ...................... | G11B 5/66 428/692.1 |
| 8,679,654 B2* | 3/2014 | Nemoto | ...................... | G11B 5/65 428/829 |
| 8,705,207 B2* | 4/2014 | Kanbe | ...................... | G11B 5/65 360/135 |
| 9,324,353 B2* | 4/2016 | Hellwig | ...................... | G11B 5/66 |
| 2001/0036564 A1 | 11/2001 | Ohmori | | |
| 2003/0034748 A1 | 2/2003 | Walters et al. | | |
| 2004/0161638 A1 | 8/2004 | Maeda et al. | | |
| 2005/0214520 A1* | 9/2005 | Oikawa | ...................... | B82Y 25/00 428/323 |
| 2007/0172705 A1* | 7/2007 | Weller | ...................... | G11B 5/66 428/827 |
| 2012/0052330 A1* | 3/2012 | Takekuma | ...................... | G11B 5/84 428/829 |
| 2012/0225325 A1 | 9/2012 | Nemoto et al. | | |
| 2012/0300600 A1* | 11/2012 | Kanbe | ...................... | G11B 5/314 369/13.32 |
| 2013/0071695 A1* | 3/2013 | Peng | ...................... | G11B 5/656 428/831 |
| 2013/0208578 A1* | 8/2013 | Kanbe | ...................... | G11B 5/65 369/13.24 |
| 2013/0293983 A1 | 11/2013 | Hirayama et al. | | |
| 2014/0153128 A1* | 6/2014 | Teguri | ...................... | G11B 5/65 360/59 |
| 2014/0377590 A1* | 12/2014 | Uchida | ...................... | G11B 5/65 428/829 |
| 2015/0004437 A1* | 1/2015 | Moriya | ...................... | G11B 5/66 428/827 |
| 2015/0132608 A1* | 5/2015 | Kataoka | ...................... | G11B 5/65 428/829 |
| 2015/0138939 A1* | 5/2015 | Hellwig | ...................... | G11B 5/66 369/13.41 |

FOREIGN PATENT DOCUMENTS

| | | |
|---|---|---|
| JP | 2011-154746 A | 8/2011 |
| JP | 2012-048784 A | 3/2012 |
| JP | 2012-181902 A | 9/2012 |
| JP | 2013-168197 A | 8/2013 |
| JP | 2013-232269 A | 11/2013 |
| WO | WO-2011/132747 A1 | 10/2011 |

OTHER PUBLICATIONS

Derwent Abstract Translation of WO 2014/087672 A1 (pub. 2014).*
Inaba et al., "New High Density Recording Technology: Energy Assisted Recording Media," Fuji Electric Journal, R&D Headquarters of Fuji Electric Co., Ltd., Jul. 10, 2010, vol. 83, Issue 4, pp. 257-260.
R.F. Penoyer, "Automatic Torque Balance for Magnetic Anisotrophy Measurements," The Review of Scientific Instruments, Aug. 1959, vol. 30, No. 8, pp. 711-714.
S. Chikazumi, "Physics of ferromagnetism vol. II," Shokabo Co., Ltd., pp. 10-21.
International Search Report in International PCT Application No. PCT/JP2014/006030, dated Mar. 10, 2015.
International Preliminary Report on Patentability in International Application No. PCT/JP2014/006030, dated Jun. 14, 2016.

* cited by examiner

PERPENDICULAR MAGNETIC RECORDING MEDIUM

TECHNICAL FIELD

The present invention relates to a perpendicular magnetic recording medium. In particular, the present invention relates to a perpendicular magnetic recording medium used in an energy-assisted magnetic recording system.

BACKGROUND ART

Perpendicular magnetic recording system is adopted as a technique for increasing the magnetic recording density. A perpendicular magnetic recording medium at least comprises a non-magnetic substrate, and a magnetic recording layer formed of a hard-magnetic material. Optionally, the perpendicular magnetic recording medium may further comprise: a soft-magnetic under layer formed of a soft magnetic material and playing a role in concentrating the magnetic flux generated by a magnetic head onto the magnetic recording layer; an interlayer for orienting the hard-magnetic material in the magnetic recording layer in an intended direction; a protective film for protecting the surface of the magnetic recording layer; and the like.

Japanese Patent Laid-Open No. 2001-291230 (PTL1) discloses a granular magnetic material as a material for forming the magnetic recording layer of the perpendicular magnetic recording medium. The granular material comprises magnetic crystal grains and a non-magnetic body segregated to surround the magnetic crystal grains. Magnetic crystal grains in the granular magnetic material are magnetically separated from each other by the non-magnetic body.

For the purpose of further increasing the recording density of the perpendicular magnetic recording medium, an urgent need for reduction in the grain diameter of the magnetic crystal grains in the granular magnetic material arises in recent years. On the other hand, reduction in the grain diameter of the magnetic crystal grains leads to a decrease in thermal stability of the recorded magnetization (signals). Thus, the magnetic crystal grains in the granular magnetic material need to be formed of materials with higher magnetocrystalline anisotropies, in order to compensate the decrease in thermal stability due to the reduction in the grain diameter of the magnetic crystal grains.

One of proposed materials having the required higher magnetocrystalline anisotropies is $L1_0$ type ordered alloys. Japanese Patent Laid-Open No. 2004-178753 (PTL2) discloses $L1_0$ type ordered alloys comprising at least one element selected from the group consisting of Fe, Co, and Ni and at least one element selected from the group consisting Pt, Pd, Au and Ir, and a method for producing the alloys. Typical $L1_0$ type ordered alloys include FePt, CoPt, FePd, CoPd, and the like.

In order to obtain the ordered alloys, not only a film-forming process at an elevated temperature, but also a special interlayer which grows the ordered structure are necessary. Against this problem, International Patent Publication No. WO 2011/132747 (PTL3) discloses a magnetic recording layer comprising an FePt alloy having the $L1_0$ type ordered structure and a metal oxide such as ZnO, and a method for manufacturing the magnetic recording layer. The problem to be solved by this proposal is to form the $L1_0$ type FePt thin film onto a polycrystalline surface such as amorphous thermal silicon oxide ($SiO_2$), for example, at a temperature as low as possible, in which a special crystal face and/or a surface treatment on the substrate made of metal or glass is unnecessary. In this method, the metal which constitutes the metal oxide is selected based on a melting point and an oxide formation free energy. Thereby, it is made possible to facilitate migration of the metal atoms in the FePt alloy even at a low temperature, thereby forming the $L1_0$ type ordered structure by rapid heating treatment for a short time.

On the other hand, reduction in the sizes of the magnetic crystal grains means reduction in the cross-sectional areas of the crystal magnetic grains having a certain height, since the thickness of the magnetic recording layer is basically uniform in in-plane directions of the medium. Therefore, a diamagnetic field acting on the magnetic crystal grains themselves decreases, whereas a magnetic field required for switching the magnetization of the magnetic crystal grains (magnetic switching field) increases. As described above, the improvement of the recording density implies that a larger magnetic field is required for recording signals, in view of the shape of the magnetic crystal grains.

Energy-assisted magnetic recording systems such as a heat-assisted recording system or a microwave-assisted recording system have been proposed as the other means against the problem of increase in the magnetic field strength required for recording (see NPL1). The heat-assisted recording system utilizes the temperature dependence of the magnetic anisotropy constant (Ku) of a magnetic material, which is a characteristic where the higher the temperature, the lower the Ku. This system uses a head having functions to heat a magnetic recording layer. That is, this system executes writing while reducing a magnetic switching field by raising the temperature of the magnetic recording layer to temporarily reduce the Ku. The recorded signals (magnetization) can be maintained stably, since the Ku returns its original high value after the temperature of the magnetic recording layer drops. In the application of the heat-assisted system, a magnetic recording layer needs to be designed taking its temperature characteristics into consideration, in addition to the conventional design guidelines.

The granular structure makes it possible to reduce magnetic interaction among the magnetic crystal grains for reducing a magnetization transition noise or the like, thereby improving a signal-to-noise ratio (SNR). On the other hand, uniform formation of the magnetic crystal grains is required, due to stringent demands on variation in magnetic properties among the respective magnetic crystal grains. However, when the magnetic crystal grains are formed of the ordered alloy, there is involved a difficulty in forming magnetic crystal grains with uniform properties. In order to alleviate the demands on uniformity of the magnetic crystal grains, a method of forming a magnetically continuous layer onto the magnetic layer having the granular structure is proposed. Japanese Patent Laid-Open No. 2013-168197 (PTL4) discloses a magnetic recording medium comprising a magnetic recording layer of a two-layered structure which consists of a first magnetic layer of a granular structure and a second magnetic layer of an amorphous structure. The purpose of this proposal is to reduce dispersion in a magnetic switching field by providing moderate magnetic interaction among the magnetic crystal grains in the first magnetic layer by the second magnetic layer. As one of constitutional examples, there is a description about an example in which the first magnetic layer has a stacked structure of a lower magnetic layer and an upper magnetic layer. The lower magnetic layer comprises an $L1_0$ type FePt alloy as a main component, and contains C. The upper magnetic layer comprises the $L1_0$ type FePt alloy as a main component and contains at least one component consisting of $SiO_2$, $TiO_2$, ZnO, and the like. The second magnetic layer comprises Co as a main component, and contains 6 to 16% by atom of Zr, and at least selected from the group consisting of B and Ta. It is explained that the first magnetic layer having the two-layered structure is effective in reducing dispersion in particle diameter and improving the SNR, and the amorphous second magnetic layer is effective in reducing dispersion in magnetic switching field (SFD), in the above constitution.

It is known that a difficulty is involved in forming a magnetic film having an ordered structure such as $L1_0$ type in high quality, and irregular growth of crystals is likely to occur during the film formation. This is because the non-magnetic material for separating the magnetic crystal grains not only fills the gaps between the magnetic crystal grains but also covers the top surface of the magnetic crystal grains. Japanese Patent Laid-Open No. 2011-154746 (PTL5) proposes a method for alleviating the irregular growth of the crystals by gradually decreasing the material for forming the grain boundary among the magnetic crystal grains along with the progress of the film formation. The magnetic recording medium comprises a substrate, a first magnetic layer of a granular structure which comprises magnetic crystal grains consisting of an $L1_0$ type ordered alloy, and a grain boundary-segregating material, and a second magnetic layer of an amorphous material. Here, the content of the grain boundary-segregating material in the first magnetic layer decreases continuously or stepwise, from the substrate to the second magnetic layer. It is described that control of the content of the grain boundary-segregating material affords a columnar structure due to continuous growth in a perpendicular direction, even when reducing a grain diameter of the magnetic crystal grains.

CITATION LIST

Patent Literature

PTL1: Japanese Patent Laid-Open No. 2001-291230
PTL2: Japanese Patent Laid-Open No. 2004-178753
PTL3: International Patent Publication No. WO 2011/132747
PTL4: Japanese Patent Laid-Open No. 2013-168197
PTL5: Japanese Patent Laid-Open No. 2011-154746

Non Patent Literature

NPL1: Inaba et al., "New High Density Recording Technology: Energy Assisted Recording Media", Fuji Electric Journal, R&D Headquarters of Fuji Electric Co., Ltd., Jul. 10, 2010, Vol. 83, Issue 4, pp. 257-260
NPL2: R. F. Penoyer, "Automatic Torque Balance for Magnetic Anisotropy Measurements", The Review of Scientific Instruments, August 1959, Vol. 30, No. 8, pp. 711-714
NPL3: Soshin Chikazumi, "Physics of ferromagnetism Vol. II", Shokabo Co., Ltd., pp. 10-21

SUMMARY OF INVENTION

Technical Problem

It is preferable to constitute the magnetic recording layer only with layers having a granular structure, in order to improve the SNR of the magnetic recording medium. When the magnetic recording medium comprises a plurality of magnetic recording layers in a stacked structure, it is preferable that each of the respective magnetic recording layers has the granular structure. However, there is involved a difficulty in obtaining a uniform granular structure with magnetic crystal grains having an ordered structure. In order to obtain the ordered structure, it is required to dispose respective atoms precisely to the particular positions of lattice points corresponding to the ordered structure. Therefore, remarkably high standards are required to the formation technique of the magnetic crystal grains, in comparison with conventionally used crystalline structure such as a hexagonal closest packing (hcp) structure or a face-centered cubic (fcc) structure. In particular, when proceeding the film formation to obtain a large thickness, irregular crystal growth is likely to occur with increase in the thickness. Therefore, under the present circumstances, a supplemental continuous film is added in order to alleviate variation in the granular structure which occurs in the magnetic recording layer, or the crystal is grown with changing the magnetic crystal grains in the thickness direction with sacrificing the uniformity of the magnetic crystal grains in the thickness direction to some degree.

In order to make the best use of inherent performance of the magnetic recording layer of the granular structure, it is required to grow the magnetic crystal grains of the ordered structure as uniformly as possible.

The present invention has been made in view of the above problem. The purpose of the present invention is to provide a magnetic recording medium made of magnetic crystal grains having an ordered structure, wherein the magnetic recording medium comprises a magnetic recording layer having a granular structure and a large thickness, and exhibits excellent magnetic properties.

Solution to Problem

The perpendicular magnetic recording medium according to one constitutional example of the present invention comprises a non-magnetic substrate and a magnetic recording layer, wherein the magnetic recording layer comprises one or more first magnetic recording layers and one or more second magnetic recording layers, the one or more first magnetic layers are odd-numbered layers from the non-magnetic substrate, the one or more second magnetic layers are even-numbered layers from the non-magnetic substrate, the first magnetic layers have a granular structure comprising first magnetic crystal grains comprising an ordered alloy and a first non-magnetic segregant surrounding the first magnetic crystal grains and comprising carbon (C), and the second magnetic layers have a granular structure comprising second magnetic crystal grains comprising an ordered alloy and a second non-magnetic segregant surrounding the second magnetic crystal grains and comprising Zn an O. For example, the magnetic recording layer may have a two-layered structure consisting of one of the first magnetic layers and one of the second magnetic layers, or a three-layered structure consisting of two of the first magnetic layers and one of the second magnetic layers. Here, the magnetic recording layer may further comprise a third magnetic recording layer. In the case where the magnetic recording layer comprises the third magnetic recording layer, it is desirable that all of the layers exhibiting magnetism which constitute the magnetic recording layer have a granular structure. Besides, the second non-magnetic segregant may constitute 10% by volume or more and 50% by volume or less of the second magnetic recording layer. In addition, the first magnetic recording layers may have a thickness of 0.5 to 4 nm, and the second magnetic recording layers may have a thickness of 1 to 20 nm. Further, it is desirable that the first magnetic crystal grains and the second magnetic crystal grains are composed from the same constituent elements. Here, the ordered alloy may be an alloy comprising at least one element selected from the group consisting of Fe and Co, and at least one element selected from the group consisting of Pt, Pd, Au and Ir. Preferably, the ordered alloy is selected from the group consisting of FePt, CoPt, FePd and CoPd. Further, the magnetic recording medium may further comprise one or more layers selected from a heat sink layer, an adhesive layer, a soft-magnetic under layer, an interlayer, and a seed layer.

Advantageous Effects of Invention

By adopting the above-described configuration, it becomes possible to obtain a magnetic recording medium comprising a magnetic recording layer having a large thickness in which separation among the magnetic crystal grains is maintained. This magnetic recording medium can be applied suitably to an energy-assisted magnetic recording system.

DESCRIPTION OF EMBODIMENTS

The magnetic recording medium comprises a non-magnetic substrate and a magnetic recording layer, wherein: the magnetic recording layer comprises one or more first magnetic recording layers and one or more second magnetic recording layers; the one or more first magnetic layers are odd-numbered layers from the non-magnetic substrate; the one or more second magnetic layers are even-numbered layers from the non-magnetic substrate; the first magnetic layers have a granular structure comprising first magnetic crystal grains comprising an ordered alloy and a first non-magnetic segregant surrounding the first magnetic crystal grains and comprising carbon; and the second magnetic layers have a granular structure comprising second magnetic crystal grains comprising an ordered alloy and a second non-magnetic segregant surrounding the second magnetic crystal grains and comprising Zn and O.

Figure 1:
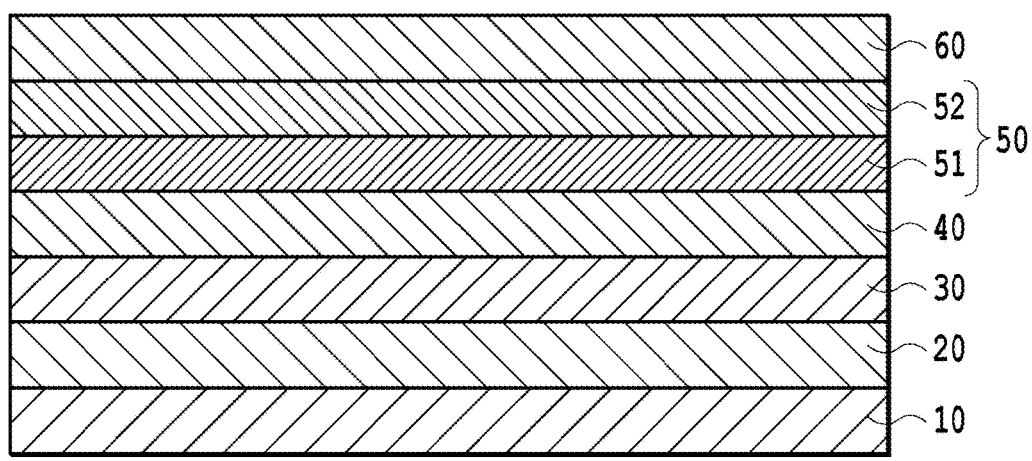
FIG. 1 is a cross-sectional diagram showing a configuration example of the magnetic recording medium according to the present invention.
Figure 2:
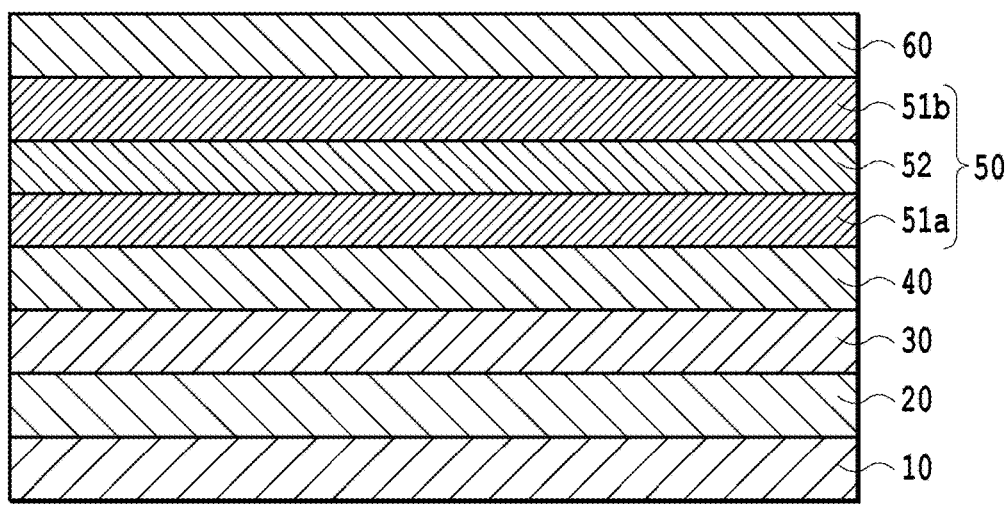
FIG. 2 is a cross-sectional diagram showing another configuration example of the magnetic recording medium according to the present invention.

FIG. 1 shows the magnetic recording medium according to one constitutional example of the present invention, which comprises magnetic recording layer 50 consisting of one first magnetic recording layer 51 and one second magnetic recording layer 52. Further, FIG. 2 shows the magnetic recording medium according to another constitutional example of the present invention, which comprises magnetic recording layer 50 consisting of two first magnetic recording layers 51 and one second magnetic recording layer 52. In FIG. 2, the two first magnetic recording layers 51 are designated by reference numerals 51a and 51b, respectively. In these constitutional examples, the magnetic recording media comprise non-magnetic substrate 10, adhesive layer 20, interlayer 30, seed layer 40, magnetic recording layer 50 and protective layer 60. Adhesive layer 20, interlayer 30, seed layer 40, and protective layer 60, shown in constitutional examples of FIGS. 1 and 2, are layers which may be optionally disposed. Further, the magnetic recording media according to these constitutional examples of the present invention may further comprise a heat sink layer, a soft-magnetic under layer, an intermediate layer, or the like between the non-magnetic substrate 10 and the magnetic recording layer 50.

First, the magnetic recording layer 50 is explained.

In the magnetic recording layer 50, favorable growth of magnetic crystal grains is made possible by stacking two layers having predetermined compositions. The first magnetic recording layer 51 in which the magnetic crystal grains are well separated is disposed first, and then the second magnetic recording layer 52 is formed by using the first magnetic recording layer 51 as a template. The magnetic recording layer 50 of a multi-layered structure having three or more layers may be formed, by repeating the above-described two-layered structure. In the magnetic recording layer 50 of a multi-layered structure, the odd-numbered layers from the non-magnetic substrate 10 are the first magnetic recording layers 51, and the even-numbered layers from the non-magnetic substrate 10 are the second magnetic recording layers 52. When adopting the multi-layered structure, the topmost layer thereof may be either of the first magnetic recording layer 51 or the second magnetic recording layer 52. Hereinafter, explanation will be made taking as an example the two-layered structure consisting of one first magnetic recording layer 51 and one second magnetic layer 52.

Good separation of the elements constituting the magnetic crystal grains from the elements constituting the non-magnetic segregant is necessary, in order that the magnetic crystal grains have a favorable ordered structure. For this purpose, it is necessary that the elements constituting the non-magnetic segregant are diffused well to be moved from the position of the magnetic crystal grains to the position of the non-magnetic segregant rapidly. In the case where the ordered alloy is an alloy comprising at least one atom selected from the group consisting of Fe and Co, and at least one atom selected from the group consisting of Pt, Pd, Au, and Ir, carbon (C) is a material exhibiting excellent diffusibility, which moves from the position of the magnetic crystal grains to the position of the non-magnetic segregant rapidly in comparison with oxides, nitrides and the like. As a result, the magnetic crystal grains and carbon are well separated from each other, to improve the degree of order of the ordered alloy constituting the magnetic crystal grains. Further, uniform magnetic crystal grains are easily obtained. However, when using carbon as the material of the non-magnetic segregant and the thickness of the magnetic recording layer is increases simply, it has become apparent that the magnetic properties of the magnetic recording layer such as a magnetic anisotropy constant (Ku) and squareness ratio deteriorate. Good separation of the magnetic crystal grains is achieved, if the thickness is about 2 nm or less. However, when the thickness exceeds about 2 nm, carbon is likely to inhibit columnar growth of the magnetic crystal grains. This is because the top surface of the magnetic crystal grains is covered with carbon which should be present normally in the boundary of the magnetic crystal grains. Further, it has been understood that the magnetic properties deteriorate by occurrence of secondary growth that the growth of the magnetic crystal grains restarts on the carbon existing on the top surface.

Therefore, the thickness of the first magnetic recording layer 51 is limited to the extent that carbon does not cover the top surface, and then the second magnetic recording layer 52 is formed onto the first magnetic recording layer 51. The second non-magnetic segregant is formed of a material having a smaller coefficient of diffusion than that of carbon. Generally, oxide materials and nitride materials are candidates of such material, since they have low diffusion performance in comparison with carbon. However, the present inventors have found that other factors should be further considered, as a result of study.

Carbon is likely to diffuse into the second non-magnetic segregant in the second magnetic recording layer 52, due to synergistic action of high diffusion performance of carbon and a coarse textural structure which the grain boundary usually has. Readiness of diffusion of carbon into the second non-magnetic segregant depends on the material which is introduced into the second non-magnetic segregant. For example, it has been understood that carbon diffuses into the second non-magnetic segregant, and, moreover, carbon reaches the top surface of the second magnetic crystal grains to inhibit crystal growth, if $SiO_2$, $TiO_2$ or the like is used as a material of the second non-magnetic segregant.

On the other hand, if Zn and O, preferably ZnO, are introduced into the second non-magnetic segregant, diffusion of carbon is suppressed so that the second magnetic crystal grains are formed in a well-separated state. This factor has not been sufficiently elucidated at the present time. Not intending to be bound to any theories, it is considered that the suppression of diffusion of carbon when Zn and O are introduced is due to the fact that Zn and ZnO do not form any carbides or carbonates by reaction with carbon.

Besides, if ZnO is used as the material of the first non-magnetic segregant in the first magnetic recording layer 51, separation of the first magnetic crystal grains tends to be insufficient. It is considered that this is because formation of crystal growth nuclei during initial stage of the growth tends to be nonuniform, due to low diffusion performance of ZnO in comparison with carbon. Therefore, when forming a layer in which ZnO is used as a non-magnetic segregant, a favorable granular structure can be formed by disposing the first magnetic recording layer 51 as an underlying layer in which separation of the magnetic crystal grains is established, and then forming the layer in which ZnO is used as the non-magnetic segregant.

Besides, the columnar growth of the magnetic crystal grains can be maintained until the total thickness reaches about 5 nm, when stacking an upper layer consisting of an ordered alloy granular magnetic material in which $SiO_2$, $TiO_2$ or the like is used as the non-magnetic segregant, onto a lower layer consisting of an ordered alloy granular magnetic material in which carbon is used as the non-magnetic segregant. However, if the total thickness exceeds 5 nm, it has been observed that the columnar growth of the magnetic crystal grains is inhibited in some areas so that the height of the magnetic crystal grains becomes nonuniform.

In comprehensive judgement of the above points, it is considered that the effect of the present invention is a unique effect obtained by particular combinations of the first magnetic recording layer 51 and the second magnetic recording layer 52.

Hereinafter, the magnetic recording layer 50 is explained in further detail.

The first magnetic recording layer 51 has a granular structure comprising first magnetic crystal grains and a first non-magnetic segregant surrounding the first magnetic crystal grains. The first magnetic crystal grains are constituted of an ordered alloy. The ordered alloy may include a small amount of crystalline defects or a small amount of impurities, as long as the first magnetic crystal grains exhibit properties of the ordered alloy. Preferably, the first magnetic crystal grains are formed of a $L1_0$ type ordered alloy. The useful $L1_0$ type ordered alloy is an alloy comprising at least one element selected from the group consisting of Fe and Co, and at least one element selected from the group consisting of Pt, Pd, Au and Ir, such as FePt, CoPt, FePd, or CoPd. metal such as Ni, Mn, Cr, Cu, Ag, Au, or Cr may be added to the $L1_0$ type ordered alloy, for the purposes of reduction in the temperature required for ordering of the ordered alloy, increase in temperature gradient of a coercive force, and/or adjustment of a ferromagnetic resonance frequency to a microwave. When Ni, Mn, or Cu is added, desirable magnetic properties can be obtained by changing magnetic properties such as a magnetic anisotropy or a Curie temperature, due to decrease in magnetic interactions. Besides, when Cu, Ag or Au is added, effects of reduction in the ordering temperature and improvement in magnetic anisotropy can be obtained.

The first non-magnetic segregant consists of a material comprising carbon as a main component. Preferably, the first non-magnetic segregant is formed of carbon. Hereinafter, for conciseness, explanation will be made taking as an example the case where the first non-magnetic segregant consists of carbon. However, discussions similar to the description set forth below are applicable to the material comprising carbon as a main component. As the thickness of the magnetic recording layer 50 increases, carbon tends to deposit onto the top surfaces of the first magnetic crystal grains in addition to in the first non-magnetic segregant, and thereby inducing the secondary growth described above. It is preferable to control excessive carbon, in order to inhibit deposition of carbon onto the top surfaces of the first magnetic crystal grains.

The volume ratio of the first non-magnetic segregant in the first magnetic recording layer 51 determines a particle diameter of the first magnetic crystal grains. It is preferable to set the particle diameter of the first magnetic crystal grains to from 5 to 12 nm. Thus, the volume ratio of the first non-magnetic segregant is preferably from 10 to 60% by volume, based on the whole of the first magnetic recording layer 51. By adopting the volume ratio described above, it is possible to increase the limit of thickness of the columnar growth of the first magnetic crystal grains, while improving the orientation and the degree of order of the second magnetic crystal grains in the second magnetic recording layer 52, and thereby increasing the magnetic anisotropy constant Ku of the magnetic recording layer 50 as a whole. Here, the phrase "limit of thickness of the columnar growth" means a maximum thickness until which the magnetic crystal grains can grow in a columnar manner.

The first magnetic recording layer 51 can have a thickness in a range from 0.5 to 4 nm, preferably in a range from 1 to 2 nm. By having the thickness within the above ranges, it is possible to decrease dispersion in the particle diameter of the first magnetic crystal grains, while promoting magnetic separation and columnar growth of the first magnetic crystal grains. Here, the degree of separation between the first magnetic crystal grains and the first non-magnetic segregant can be evaluated by an α value of a hysteresis loop. The phrase "α value of a hysteresis loop" means a slope of the magnetization curve in the vicinity of a coercive force (H=Hc), and calculated by the equation of $\alpha=4\pi\times(dM/dH)$. When determining the α value, a unit "$emu/cm^3$" is used as the unit of M, and a unit "Oe" is used as the unit of H. The α value increases if the magnetic crystal grains in the granular structure are not magnetically separated well. On the other hand, the α value decreases if the magnetic properties of the magnetic crystal grains vary greatly, in such a case where crystal grains due to secondary growth are present. The α value is preferably in a range of 0.75 or more and less than 3.0, and more preferably in a range of 0.9 or more and less than 2.0. Besides, the phrase "secondary growth of the first magnetic crystal grains" means a phenomenon that the top surface of the first magnetic crystal grains that have grown from the underlying layer is covered with the material constituting the first non-magnetic segregant, and then magnetic crystal grains of a random orientation grow on the covering material. If the secondary growth of the first magnetic crystal grains occurs, the magnetic anisotropy of the magnetic recording layer 50 as a whole is lowered, due to disturbances in orientation of the magnetic crystal grains.

The second magnetic recording layer 52 has a granular structure comprising second magnetic crystal grains and a second non-magnetic segregant surrounding the second magnetic crystal grains. The second magnetic crystal grains are constituted of an ordered alloy, similarly to the first magnetic crystal grains. The ordered alloy may include a small amount of crystalline defects or a small amount of impurities, as long as the second magnetic crystal grains exhibit properties of the ordered alloy. Preferably, the second magnetic crystal grains are formed of a L10 type ordered alloy. On the other hand, the second non-magnetic segregant comprises Zn and O. Preferably, the second non-magnetic segregant comprises ZnO. More preferably, the second non-magnetic segregant consists of ZnO. The second magnetic crystal grains are formed on the first magnetic crystal grains, and the second non-magnetic segregant is formed on the first non-magnetic segregant. The present inventors have been found that ZnO makes it possible to increase the thickness of the second magnetic recording layer 52, while maintaining the magnetic separation of the second magnetic crystal grains. This effect is especially remarkable for ZnO, among the other investigated metal oxides. The volume ratio of the second non-magnetic segregant is preferably from 10 to 50% by volume, based on the whole of the second magnetic recording layer 52. More preferably, the volume ratio of the second non-magnetic segregant is from 20 to 40% by volume. By adopting the volume ratio described above, it is possible to obtain the magnetic recording layer 50 having a large magnetic anisotropy constant Ku, while maintaining the good magnetic separation and the high degree of order of the second magnetic crystal grains.

The second magnetic recording layer 52 can have a thickness of 20 nm or less, preferably 7 nm or less. By having the thickness within the above ranges, it is possible to prevent a plurality of the second magnetic crystal grains from coalescing together to form giant crystal grains. The giant crystal grains deteriorate the magnetic separation of the magnetic crystal grains. Further, the second magnetic recording layer 52 preferably has a thickness of 1 nm or more, in order to ensure sufficient crystal growth.

Exchange interaction between adjacent magnetic crystal grains decreases to allow magnetic recording with a high density, by the facts that the first magnetic recording layer 51 and the second magnetic recording layer 52 have the granular structure, and that the second magnetic crystal grains are formed onto the first magnetic crystal grains to form magnetic crystal grains extending through the thickness of the magnetic recording layer 50. Besides, it is preferable that the first magnetic crystal grains and the second magnetic crystal grains are constituted from the same constituent elements. This is because epitaxial growth from the first magnetic crystal grains to the second magnetic crystal grains is promoted to increase the degree of order of the ordered alloy, by adopting the same constituent elements.

When forming the magnetic recording layer 50, the first magnetic recording layer 51 is formed first. The formation of the first magnetic recording layer 51 is preferably carried out by a sputtering method involving heating of the substrate. Subsequently, the second magnetic recording layer 52 is formed onto the first magnetic recording layer 51. Preferably, the formation of the second magnetic recording layer 52 is carried out by the sputtering method involving heating of the substrate similarly to the first magnetic recording layer 51, except for difference of target(s) to be used. Here, the second magnetic crystal grains in the second magnetic recording layer 52 are formed onto the first magnetic crystal grains in the first magnetic recording layer 51. The substrate temperature when forming the first magnetic recording layer 51 and the second magnetic recording layer 52 is preferably in a range from 400° C. to 500° C. By adopting the substrate temperature within this range, it becomes possible to improve the degree of order of the $L1_0$ type ordered alloy material in the first and second magnetic crystal grains.

By adopting the above constitution, columnar growth of the magnetic crystal grains in the first magnetic recording layer and the magnetic crystal grains in the second magnetic recording layer in a one-to-one manner occurs. In other words, the columnar growth of the second magnetic crystal grains in the second magnetic layer is achieved by taking over that of the first magnetic crystal grains in the first magnetic layer. As a result, magnetic crystal grains extending through the thickness of the magnetic recording layer 50 are formed. In this way, it is possible to obtain a magnetic recording medium comprising the magnetic recording layer having a large thickness as well as a desirable magnetic anisotropy constant, by suppressing secondary growth of the first and second magnetic crystal grains.

Also in the multi-layer stacked constitutions having three or more layers which consists of a plurality of the first magnetic recording layers 51 and one or more of the second magnetic recording layers 52, magnetic crystal grains extending through the thickness of the magnetic recording layer 50 are formed. Therefore, it is possible to obtain a magnetic recording medium comprising the magnetic recording layer having a large thickness as well as a desirable magnetic anisotropy constant, by suppressing secondary growth of the first and second magnetic crystal grains.

Further different embodiment of the magnetic recording layer 50 involves a constitution in which a third magnetic recording layer is further disposed in addition to the first magnetic recording layer 51 and the second magnetic recording layer 52 described above. It becomes possible to further improve the performance of the magnetic recording medium by disposing the third magnetic recording layer. In the explanation below, the stacked constitution of the first magnetic recording layers 51 and the second magnetic recording layers 52 is referred to as "fundamental magnetic recording layers".

One of exemplary constitutions is a constitution in which the third magnetic recording layer having different Curie temperature Tc from that of the fundamental magnetic recording layers and intending to control Tc (hereinafter, referred to as "Tc control magnetic recording layer") is further disposed. By setting the recording temperature in accordance with Tc's of the both layers, the magnetic switching field of the magnetic recording medium as a whole, which is required during recording, can be decreased. For example, if the Curie temperature of the Tc control magnetic recording layer is set below the Curie temperature of the fundamental magnetic recording layers, and the recording temperature is set between the Curie temperatures of both of the magnetic recoding layers, the magnetic field required to recording is reduced, due to disappearance of the magnetization of the Tc control magnetic recording layer at the time of recording. As described above, it becomes possible to exhibit a good magnetic recording performance by reducing the magnetic field required for a magnetic recording head during recording.

The Tc control magnetic recording layer may be disposed on or under the fundamental magnetic recording layer. The Tc control magnetic recording layer preferably has a granular structure. It is particularly preferable to dispose the magnetic crystal grains of the Tc control magnetic recording layer and the fundamental magnetic recording layers at approximately the same positions. It becomes possible to improve performances such as SNR, by disposing the grains at approximately the same positions.

The magnetic crystal grains constituting the Tc control magnetic recording layer is preferably formed of a material comprising at least one of Co or Fe, wherein the material preferably further comprises at least one of Pt, Pd, Ni, Mn, Cr, Cu, Ag or Au. For example, CoCr-based alloys, CoCrPt-based alloys, FePt-based alloys, and FePd-based alloys can be used. The crystalline structure of the magnetic crystal grains may be an ordered structure such as $L1_0$ type, $L1_1$ type or $L1_2$ type, an hcp structure, an fcc structure, or the like.

As the material for forming the non-magnetic segregant which constitutes the Tc control magnetic recording layer, ZnO as described above, oxides such as $SiO_2$ or $TiO_2$, nitrides such as SiN or TiN, C, B or the like can be used.

A layer formed of a material similar to that of the fundamental magnetic recording layers but the composition of which is different may be used as the Tc control magnetic recording layer. For example, a layer in which the content of ZnO in the second magnetic recording layer is changed, a layer in which the element to be added to the ordered alloy, such as Ni, is changed, or the like can be used as the Tc control magnetic recording layer.

It is preferable to dispose an exchange coupling control layer between the fundamental magnetic recording layers and the Tc control magnetic recording layer, in order to adjust magnetic exchange coupling therebetween. The magnetic switching field can be controlled by adjusting the magnetic exchange coupling at the recording temperature. The exchange coupling control layer may be either of a layer exhibiting magnetism or a non-magnetic layer, depending on the desired exchange coupling. It is preferable to use the non-magnetic layer, in order to enhance the effect of decreasing the magnetic switching field at the recording temperature.

The third magnetic recording layer has a function to keep the magnetization corresponding to the recorded information (for example, information of "0" and "1") at the record-storing temperature in cooperation with the fundamental magnetic recording layers, and/or a function to facilitate recording at the recording temperature in cooperation with the fundamental magnetic recording layers. In order to contribute to this purpose, other type of the third magnetic recording layer may be added, instead of or in addition to the Tc control magnetic recording layer. For example, the third magnetic recording layer for controlling magnetic properties, or the third magnetic recording layer for controlling ferromagnetic resonance frequency which is directed to the microwave-assisted magnetic recording system may be added. Here, magnetic properties to be controlled include Ku, a magnetic switching field, a coercive force Hc, a saturated magnetization Ms, and the like. Further, the third magnetic recording layer to be added may be a single layer, or have a stacked structure of different layers which, for example, have different compositions. The third magnetic recording layer to be added is preferably a film having a granular structure, rather than a magnetically continuous film. This is because the performance of the magnetic recording medium can be improved by adopting the granular structure. For example, it is possible to exhibit a high SNR by suitably adjusting the magnetic interactions among the magnetic crystal grains.

Hereinafter, other components for constituting the magnetic recording medium will be explained.

The non-magnetic substrate 10 may be various substrates having a flat surface. For example, the non-magnetic substrate 10 may be formed of material commonly used in magnetic recording media, such as a NiP-plated Al alloy, monocrystalline MgO, tempered glass, crystallized glass, and the like.

The adhesive layer 20 that may be formed optionally is used for enhancing the adhesion between the layer formed on it and the layer formed under it (including the non-magnetic substrate 10). If the adhesive layer 20 is disposed on the upper surface of the non-magnetic substrate 10, the adhesive layer 20 can be formed of a material having good adhesion to the material of the non-magnetic substrate 10. Such material includes a metal such as Ni, W, Ta, Cr or Ru, or an alloy containing the above-described metal. Alternatively, the adhesive layer 20 may be formed between two constituent layers other than the non-magnetic substrate 10. The adhesive layer 20 may be a single layer or have a stacked structure with plural layers.

The soft-magnetic under layer (not shown) that may be formed optionally controls the magnetic flux emitted from a magnetic head, to improve the read-write characteristics of the magnetic recording medium. The material used for forming the soft-magnetic under layer includes: a crystalline material such as a NiFe alloy, a sendust (FeSiAl) alloy, or a CoFe alloy; a microcrystalline material such as FeTaC, CoFeNi or CoNiP; and an amorphous material including a Co alloy such as CoZrNb or CoTaZr. The optimum thickness of the soft-magnetic under layer depends on the structure and characteristics of the magnetic head used in magnetic recording. When forming the soft-magnetic under layer continuously with other layers, the soft-magnetic under layer preferably has a thickness in a range from 10 nm to 500 nm (both inclusive), in view of productivity.

When using the above-described magnetic recording medium in a heat-assisted magnetic recording system, a heat sink layer (not shown) may be provided. The heat sink layer is a layer for effectively absorbing excess heat of the magnetic recording layer 50 that is generated during heat-assisted magnetic recording. The heat sink layer can be formed of a material having a high thermal conductivity and a high specific heat capacity. Such material includes a Cu simple substance, an Ag simple substance, an Au simple substance, or an alloy material composed mainly of these substances. As used herein, the expression "composed mainly of" means that the content of the concerned material is 50 wt % or more. In consideration of its strength or the like, the heat sink layer can be formed of an Al—Si alloy, a Cu—B alloy or the like. Further, the function of the soft-magnetic under layer (that is, the function of concentrating a perpendicular magnetic field generated by the head) can be imparted to the heat sink layer by forming the heat sink layer of a sendust (FeSiAl) alloy, a soft-magnetic CoFe alloy, or the like. The optimum thickness of the heat sink layer depends on the amount and distribution of heat generated during heat-assisted magnetic recording, as well as the layer configuration of the magnetic recording medium and the thickness of each constituent layer. When forming the heat sink layer continuously with other constituent layers, the heat sink layer preferably has a thickness of 10 nm or more and 100 nm or less, in view of productivity. The heat sink layer can be formed by any process known in the art, such as a sputtering method (including a DC magnetron sputtering method) or a vacuum deposition method. Normally, the heat sink layer is formed by the sputtering method. The heat sink layer can be formed between the non-magnetic substrate 10 and the adhesive layer 20, between the adhesive layer 20 and the interlayer 30, or the like, in view of properties required for the magnetic recording medium.

The interlayer 30 is a layer provided for the purpose of preventing the crystalline structure of the layer formed below from affecting the crystalline orientation and the size of the magnetic crystal grains in the magnetic recording layer 50. In the case where the soft-magnetic under layer is provided, the interlayer 30 needs to be non-magnetic, in order to prevent the magnetic influence on the soft-magnetic under layer. The material for forming the interlayer 30 includes metals such as Cr or Ta, a NiW alloy, and Cr-based alloys such as CrTi, CrZr, CrTa, or CrW. The interlayer 30 can be formed by any process known in the art, such as a sputtering method.

The purpose of the seed layer 40 is to ensure the adhesion between the magnetic recording layer 50 and the underlying layer such as the interlayer 30, and to control the grain diameter and the crystalline orientation of the first and second magnetic crystal grains in the magnetic recording layer 50 which is an upper layer of the seed layer 40. The seed layer 40 is preferably non-magnetic. In addition, if the magnetic recording medium comprising the seed layer 40 is used in a heat-assisted magnetic recording system, the seed layer 40 preferably act as a thermal barrier for controlling rise in temperature and distribution of temperature of the magnetic recording layer 50. In order to control rise in temperature and distribution of temperature of the magnetic recording layer 50, the interlayer 40 preferably has both of: a function of rapidly raising the temperature of the magnetic recording layer 50 when the magnetic recording layer 50 is heated during heat-assisted recording; and a function to transfer the heat in the magnetic recording layer 50 to the underlying layer by heat conduction in a depth direction, before the in-plane heat conduction in the magnetic recording layer 50 occurs.

In order to achieve the above functions, the material of the seed layer 40 is appropriately selected in accordance with the material of the magnetic recording layer 50. More specifically, the material of the seed layer 40 is selected in accordance with the material of the magnetic crystal grains in the magnetic recording layer. For example, if the magnetic crystal grains in the magnetic recording layer are formed of an $L1_0$ type ordered alloy, it is preferable to form the seed layer 40 of an NaCl-type compound. Particularly preferably, the seed layer 40 is formed of oxides such as MgO or $SrTiO_3$, or nitrides such as SiN. In addition, the seed layer 40 can be formed by stacking a plurality of layers consisting of the above-described materials. The seed layer preferably has a thickness from 1 nm to 60 nm, more preferably from 1 nm to 20 nm, in view of improvement in crystallinity of the magnetic crystal grains in the magnetic recording layer 50, and improvement in productivity. The seed layer 40 can be formed by any process known in the art, such as a sputtering method (including an RF magnetron sputtering method and a DC magnetron sputtering method) or a vacuum deposition method.

The protective layer 60 can be formed of a material conventionally used in the field of magnetic recording media. Specifically, the protective layer 60 can be formed of non-magnetic metal such as Pt, a carbon-based material such as diamond-like carbon, or silicon-based material such as silicon nitride. The protective layer 60 may be a single layer or have a stacked structure. The stacked structure of the protective layer 60 may be a stacked structure of two types of carbon-based material having different characteristics from each other, a stacked structure of metal and a carbon-based material, or a stacked structure of metallic oxide film and a carbon-based material, for example. The protective layer 60 can be formed by any process known in the art such as a sputtering method (including a DC magnetron sputtering method) or a vacuum deposition method.

Optionally, the magnetic recording medium may further comprise a liquid lubricant layer (not shown) disposed on the protective layer 60. The liquid lubricant layer can be formed of a material conventionally used in the field of magnetic recording media, such as perfluoropolyether-based lubricants or the like. The liquid lubricant layer can be formed by a coating method such as a dip-coating method, a spin-coating method, or the like, for example.

EXAMPLES

Example 1

A chemically strengthened glass substrate having a flat surface (N-10 glass substrate manufactured by HOYA CORPORATION) was washed to prepare non-magnetic substrate 10. The washed non-magnetic substrate 10 was brought into a sputtering device. Then, Ta adhesive layer 20 having a thickness of 5 nm was formed by a DC magnetron sputtering method using a pure Ta target in Ar gas at a pressure of 0.3 Pa.

Next, Cr interlayer 30 having a thickness of 20 nm was formed by a DC magnetron sputtering method using a pure Cr target in Ar gas at a pressure of 0.3 Pa.

Next, the substrate was heated to a temperature of 300° C., and then MgO seed layer 40 having a thickness of 5 nm was formed by an RF sputtering method using an MgO target in Ar gas at a pressure of 0.18 Pa. The applied RF power was 100 W.

Next, the stacked body in which the seed layer 40 had been formed was heated to a temperature of 450° C., and then FePt—C first magnetic recording layer 51 having a thickness of 2 nm was formed by a DC magnetron sputtering method using a target containing $Fe_{50}Pt_{50}$ and C in Ar gas at a pressure of 1.5 Pa. Here, the composition of the $Fe_{50}Pt_{50}$—C target was adjusted such that the obtained first magnetic recording layer 51 had a composition of 60% by volume of $Fe_{50}Pt_{50}$ and 40% by volume of C. The applied DC power was 40 W.

Next, FePt—ZnO second magnetic recording layer 52 having a thickness of 7 nm was formed by a DC magnetron sputtering method using a target containing $Fe_{50}Pt_{50}$ and ZnO in Ar gas at a pressure of 1.5 Pa, in the state that the stacked body was heated at a temperature of 450° C. Here, the composition of the $Fe_{50}Pt_{50}$—ZnO target was adjusted such that the obtained second magnetic recording layer 52 had a composition of 65% by volume of $Fe_{50}Pt_{50}$ and 35% by volume of ZnO. The applied DC power was 40 W.

Next, Pt protective layer 60 having a thickness of 3 nm was formed by a DC magnetron sputtering method using a Pt target in Ar gas at a pressure of 0.3 Pa and at the substrate temperature of 25° C., to obtain a magnetic recording medium.

The M-H hysteresis loop of the resultant magnetic recording medium was measured with a PPMS apparatus (Physical Property Measurement System, manufactured by Quantum Design, Inc.). The obtained M-H hysteresis loop is shown in FIG. 6B. In addition, a coercive force He and an α value were determined based on the obtained M-H hysteresis loop. Further, the magnetic anisotropy constant Ku of the obtained magnetic recording medium was determined by evaluating, with a PPMS apparatus, the dependence of spontaneous magnetization on the angle at which the magnetic field is applied. The methods described in the publications: R. F. Penoyer, "Automatic Torque Balance for Magnetic Anisotropy Measurement", The Review of Scientific Instruments, August 1959, Vol. 30, No. 8, pp. 711-714 (NPL2); and Soshin Chikazumi, "Physics of ferromagnetism Vol. II", Shokabo Co., Ltd., pp. 10-21 (NPL3) were used in determination of the magnetic anisotropy constant Ku. The magnetic recording medium of this example had the coercive force of 9.6 kOe (760 A/mm), the α value of 2.8, and a net magnetic anisotropy constant of the magnetic crystal grains Ku_grain of $1.62×10^6$ erg/cm$^3$ ($16.2×10^5$ J/m$^3$).

Besides, the cross-section of the magnetic recording medium of this example, and the top surface of a sample which had been sampled just after formation of the second magnetic recording layer 52 were observed with a transmission electron microscope (TEM). The TEM photograph of the cross-section of the magnetic recording medium was shown in FIG. 3A, and the TEM photograph of the top surface of the above-described sample was shown in FIG. 3B. Furthermore, the layer constitution on the design was also shown in FIG. 3A.

Comparative Example 1

A magnetic recording medium was obtained by repeating the procedure of Example 1, except that FePt—SiO$_2$ second magnetic recording layer 52 having a thickness of 7 nm was formed by a DC magnetron sputtering method using a target containing $Fe_{50}Pt_{50}$ and SiO$_2$. Here, the composition of the $Fe_{50}Pt_{50}$—SiO$_2$ target was adjusted such that the obtained second magnetic recording layer 52 had a composition of 75% by volume of $Fe_{50}Pt_{50}$ and 25% by volume of SiO$_2$.

Figure 6A:
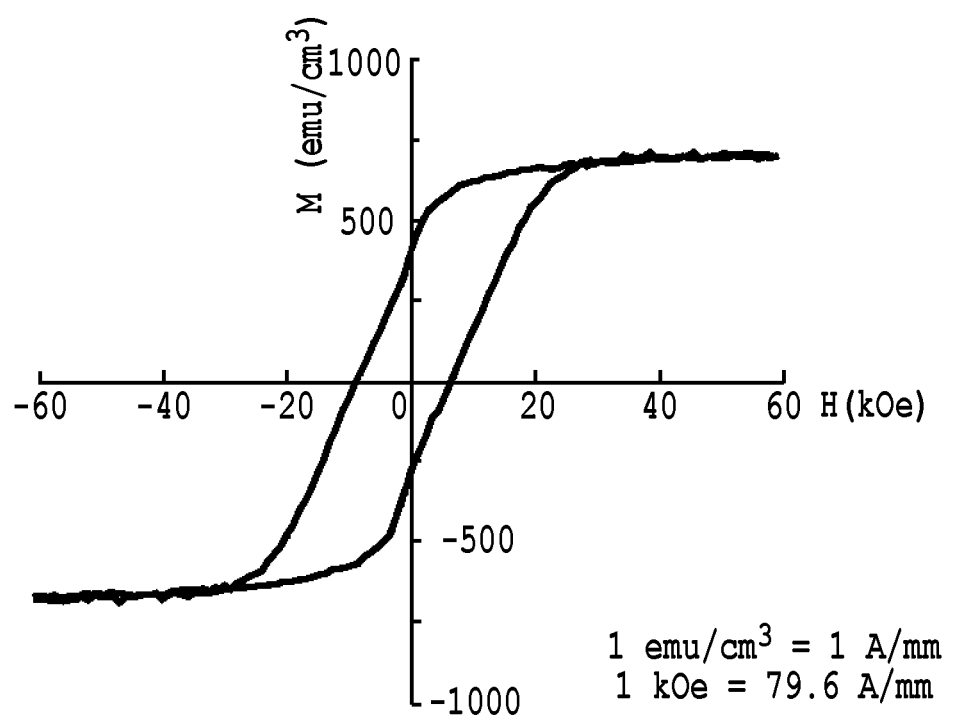
FIG. 6A shows an M-H hysteresis loop of the magnetic recording medium of Comparative Example 1.
Figure 6B:
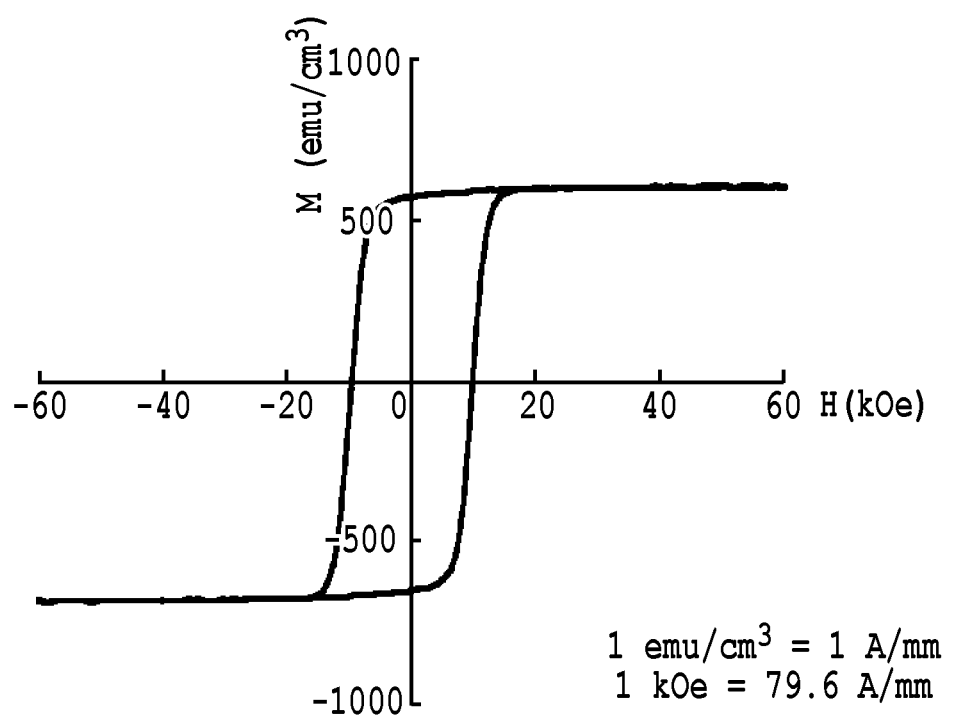
FIG. 6B shows an M-H hysteresis loop of the magnetic recording medium of Example 1.

The obtained M-H hysteresis loop is shown in FIG. 6A. The magnetic recording medium of this comparative example had the coercive force of 7.6 kOe (610 A/mm), the α value of 0.55, and a net magnetic anisotropy constant of the magnetic crystal grains Ku_grain of $7.2×10^6$ erg/cm$^3$ ($7.2×10^5$ J/m$^3$).

Besides, the cross-section of the magnetic recording medium of this comparative example, and the top surface of a sample which had been sampled just after formation of the second magnetic recording layer 52 were observed with a transmission electron microscope (TEM). The TEM photograph of the cross-section of the magnetic recording medium was shown in FIG. 4A, and the TEM photograph of the top surface of the above-described sample was shown in FIG. 4B. Furthermore, the layer constitution on the design was also shown in FIG. 4A.

Comparative Example 2

A magnetic recording medium was obtained by repeating the procedure of Example 1, except that FePt—ZnO second magnetic recording layer 52 was not formed, and that the thickness of the FePt—C first magnetic recording layer 51 was changed to 9 nm.

The cross-section of the magnetic recording medium of this comparative example was observed with a transmission electron microscope (TEM). The TEM photograph of the cross-section of the magnetic recording medium was shown in FIG. 5. Furthermore, the layer constitution on the design was also shown in FIG. 5.

(Evaluation 1)

Figure 3A:
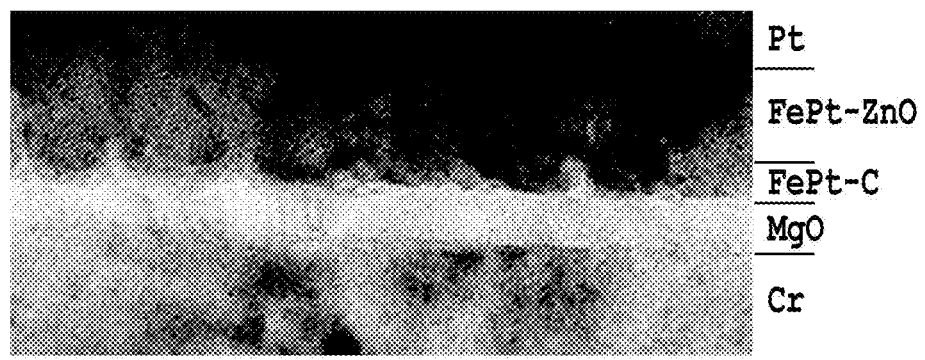
FIG. 3A is a cross-sectional TEM photograph showing the structure of the magnetic recording layer of the magnetic recording medium of Example 1.
Figure 3B:
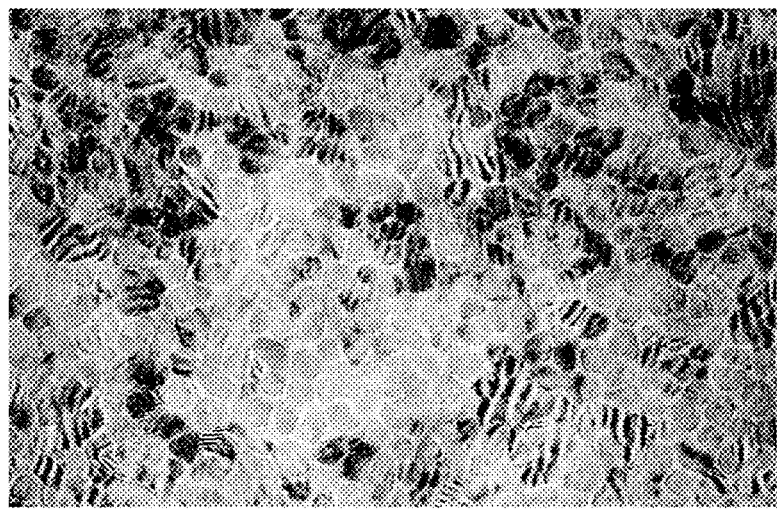
FIG. 3B is a top-view TEM photograph showing the structure of the magnetic recording layer of the magnetic recording medium of Example 1.
Figure 4A:
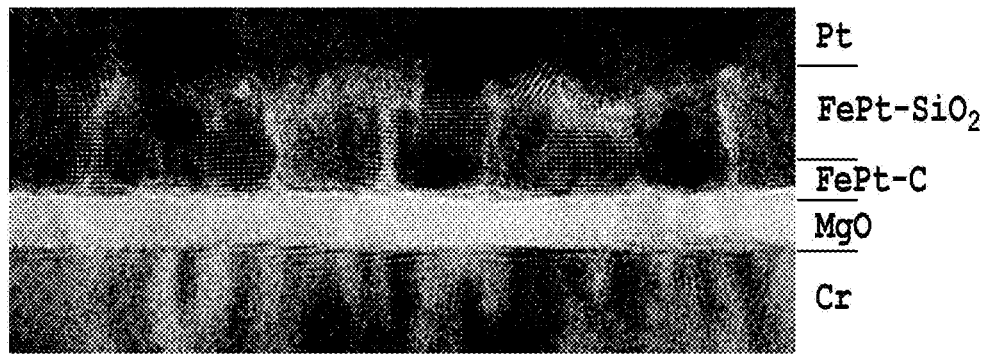
FIG. 4A is a cross-sectional TEM photograph showing the structure of the magnetic recording layer of the magnetic recording medium of Comparative Example 1.
Figure 4B:
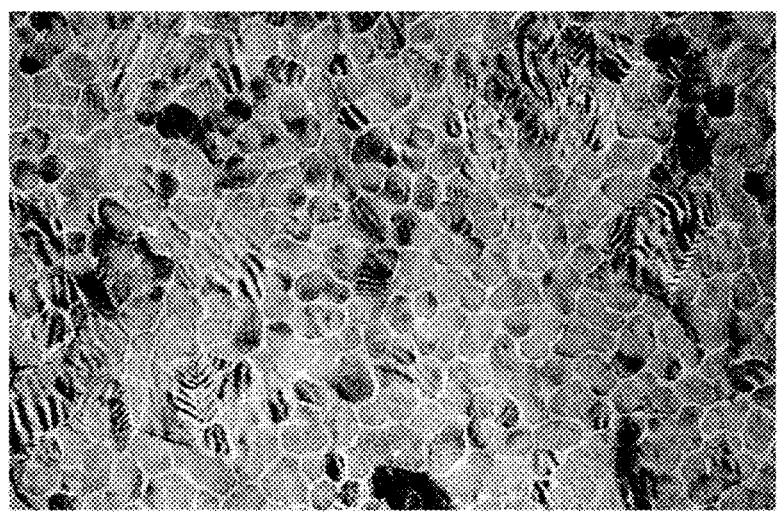
FIG. 4B is a top-view TEM photograph showing the structure of the magnetic recording layer of the magnetic recording medium of Comparative Example 1.

Based on the TEM photographs of the top surfaces shown in FIGS. 3B and 4B, the magnetic crystal grains consisting of FePt were well separated, in the magnetic recording media of Example 1 and Comparative Example 1.

Further, based on the TEM photograph of FIG. 3A, it is understood that carbon (portions having white and bright appearance in the TEM photograph) exists only within the region to a height up to 2 nm from the MgO layer. Here, "2 nm" is a design value of the thickness of the FePt—C first magnetic recording layer 51. Therefore, carbon has not diffused toward the top surfaces of the FePt magnetic crystal grains in the second magnetic recording layer. Further, it is understood from the M-H hysteresis loop shown in FIG. 6B that the magnetic recording medium of Example 1 has the relatively large coercive force He and the α value of more than 1. These properties are caused by low dispersion in magnetic properties of the magnetic crystal grains in the magnetic recording layer 50. Further, it is understood that the magnetic recording layer 50 in the magnetic recording medium of Example 1 has the large magnetic anisotropy constant Ku, and that the degree of order of FePt in the magnetic crystal grains is high.

On the other hand, it is observed from the cross-sectional TEM photograph shown in FIG. 4A that carbon has diffused to the top surfaces of the FePt magnetic crystal grains in the second magnetic recording layer, in the magnetic recording medium of Comparative Example 1 which has the second magnetic recording layer consisting of FePt—SiO$_2$. Therefore, it is understood that the heights of the magnetic crystal grains from the MgO layer varies in a range from 5 nm to 9 nm, in the magnetic recording medium of Comparative Example 1. Further, it is understood from the M-H hysteresis loop shown in FIG. 6A that the magnetic recording medium of Comparative Example 1 has the relatively small coercive force He in comparison with the magnetic recording medium of Example 1, and the α value of less than 1. These properties are caused by the presence of magnetic crystal grains having poor magnetic properties in the magnetic recording layer 50, and a high dispersion of the magnetic crystal grains. Further, it is understood that the magnetic recording medium of Example 1 has the small magnetic anisotropy constant Ku in comparison with the magnetic recording medium of Example 1, and that the degree of order of FePt in the magnetic crystal grains is slightly low.

In view of the above results, it is understood that ZnO constituting the second non-magnetic segregant of the magnetic recording medium of Example 1 remarkably suppresses the diffusion of carbon, in comparison with other metal oxides such as SiO$_2$ constituting the second non-magnetic segregant of the magnetic recording medium of Comparative Example 1.

Figure 5:
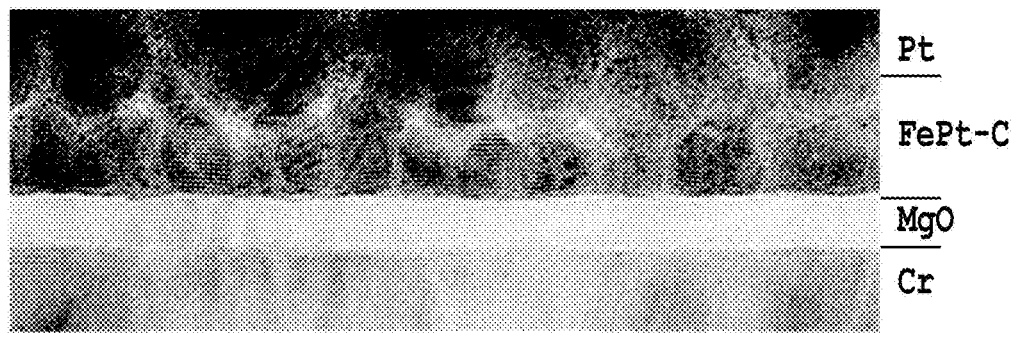
FIG. 5 is a cross-sectional TEM photograph showing the structure of the magnetic recording layer of the magnetic recording medium of Comparative Example 2.

Further, with reference to the cross-sectional TEM photograph shown in FIG. 5, it is understood that secondary growth of magnetic crystal grains occurs in a region at a distance from 2 to 7 nm from the MgO layer, in the magnetic recording medium of Comparative Example 2 which has the FePt—C first magnetic recording layer having a thickness of 9 nm but has not the second magnetic recording layer. That is, it is understood that carbon, which constitutes the non-magnetic segregant, diffuses to the top surface of the FePt magnetic crystal grains, and thereby columnar growth of the FePt magnetic crystal grains being interrupted. Then, FePt magnetic crystal grains are formed onto the carbon which has been diffused to the top surface.

Example 2

A magnetic recording medium was obtained by repeating the procedure of Example 1, except for the following differences.
(a) The stacked body in which the adhesive layer 20 had been formed was heated to a temperature of 400° C., and then an MgO intermediate layer having a thickness of 1 nm was formed by an RF sputtering method using an MgO target in Ar gas at a pressure of 0.1 Pa. The applied RF power was 100 W. The Cr interlayer 30 was formed onto the MgO intermediate layer.
(b) The composition of the second magnetic recording layer 52 was changed to 75% by volume of Fe$_{50}$Pt$_{50}$ and 25% by volume of ZnO. The thickness of the second magnetic recording layer 52 was changed to 3 nm.
(c) The protective layer 60 was changed to a stacked structure of a Pt layer having a thickness of 5 nm and a Ta layer having a thickness of 5 nm. The Ta layer was formed by a DC magnetron sputtering method using a pure Ta target in Ar gas at a pressure of 0.3 Pa.

The magnetic recording medium of this example comprised the Ta adhesive layer 20 having a thickness of 5 nm, the MgO intermediate layer having a thickness of 5 nm, the Cr interlayer 30 having a thickness of 20 nm, the MgO seed layer 40 having a thickness of 5 nm, the FePt—C first magnetic recording layer 51 having a thickness of 2 nm, the FePt—ZnO second magnetic recording layer 52 having a thickness of 3 nm, and the protective layer 60 having a stacked structure of the Pt layer having a thickness of 5 nm and the Ta layer having a thickness of 5 nm, in this order from the non-magnetic substrate 10. Beside, the FePt—C first magnetic recording layer 51 had a composition of 60% by volume of Fe$_{50}$Pt$_{50}$ and 40% by volume of C. The FePt—ZnO second magnetic recording layer 52 had a composition of 75% by volume of Fe$_{50}$Pt$_{50}$ and 25% by volume of ZnO.

Figure 7A:
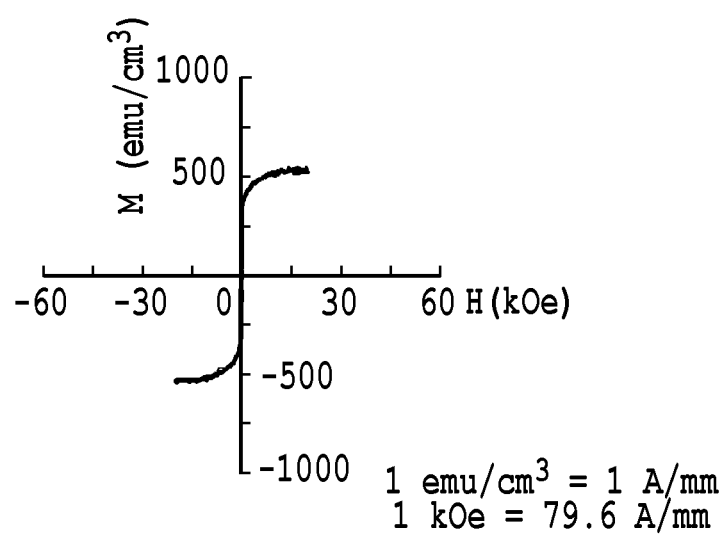
FIG. 7A shows an M-H hysteresis loop in the in-plane direction of the magnetic recording medium of Comparative Example 3.
Figure 7B:
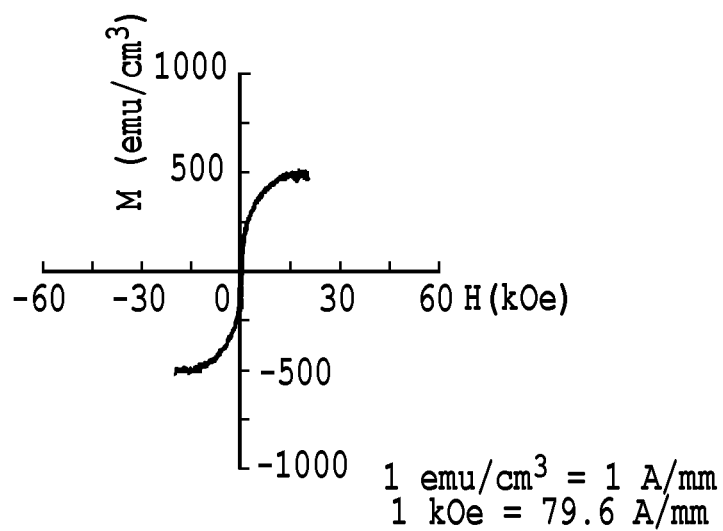
FIG. 7B shows an M-H hysteresis loop in the perpendicular direction of the magnetic recording medium of Comparative Example 3.
Figure 7C:
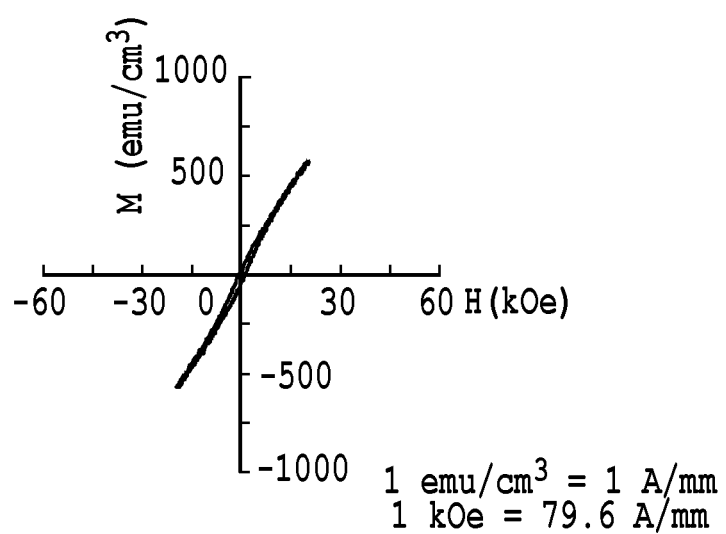
FIG. 7C shows an M-H hysteresis loop in the in-plane direction of the magnetic recording medium of Example 2.
Figure 7D:
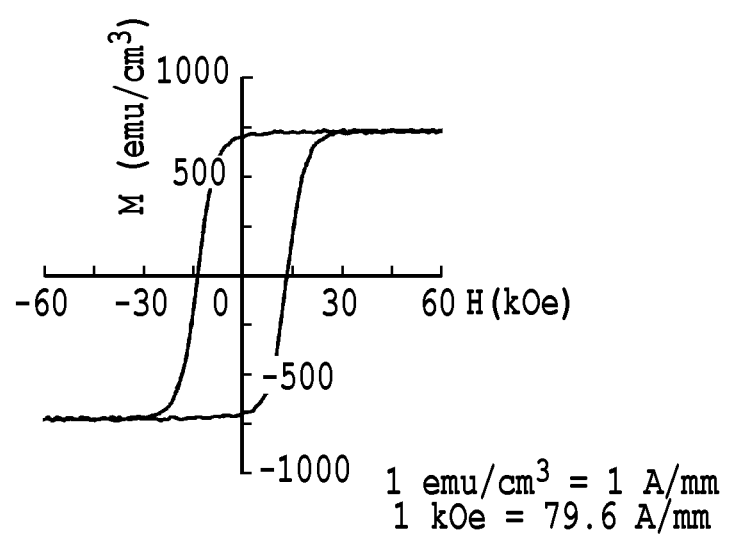
FIG. 7D shows an M-H hysteresis loop in the perpendicular direction of the magnetic recording medium of Example 2.

The M-H hysteresis loop in the in-plane direction of the magnetic recording medium of this example is shown in FIG. 7C, and the M-H hysteresis loop in the perpendicular direction is shown in FIG. 7D. The magnetic recording medium of this example had a coercive force of 13.52 kOe (1076 A/mm) and an α value of 1.62, in the perpendicular direction.

Comparative Example 3

A magnetic recording medium was obtained by repeating the procedure of Example 2, except that FePt—C first magnetic recording layer 51 was not formed, and that the thickness of the FePt—ZnO second magnetic recording layer 52 was changed to 4 nm.

The M-H hysteresis loop in the in-plane direction of the magnetic recording medium of this comparative example is shown in FIG. 7A, and The M-H hysteresis loop in the perpendicular direction is shown in FIG. 7B. The magnetic recording medium of this comparative example had a coercive force of 0.06 kOe (5 A/mm) and an α value of 4.40, in the perpendicular direction.
(Evaluation 2)

It is understood from the M-H hysteresis loops shown in FIGS. 7A and 7B that the magnetic recording medium of Comparative Example 3 has poor anisotropy. Further, in the magnetic recording medium of Comparative Example 1, the coercive force He is small and the α value is much larger than 1, in the perpendicular direction. It is understood from these measurement results that magnetic separation of the FePt magnetic crystal grains is poor in the magnetic recording medium of Comparative Example 3 in which the FePt—ZnO second magnetic recording layer is directly formed onto the MgO seed layer.

On the other hand, it is understood from the M-H hysteresis loops shown in FIGS. 7C and 7D that the magnetic recording medium of Example 2 shows remarkable anisotropy. Further, the magnetic recording medium of Example 2 has the large coercive force He and the α value close to 1, in the perpendicular direction. It is understood from these measurement results that the FePt magnetic crystal grains are magnetically separated well in both of the first and second magnetic recording layers, in the magnetic recording medium of Example 2 in which the FePt—C first magnetic recording layer and the FePt—ZnO second magnetic recording layer is formed onto the MgO seed layer in this order.

In view of the above results, it is understood that the FePt—C first magnetic recording layer 51, which underlies the FePt—ZnO second magnetic recording layer 52, is necessary to separate the FePt magnetic crystal grains from the ZnO non-magnetic segregant in the FePt—ZnO second magnetic recording layer 52. It is considered that this is because the FePt—C first magnetic recording layer 51 establishes the separation of the first magnetic crystal grains with the first non-magnetic segregant, and then the second magnetic crystal grains in the FePt—ZnO second magnetic recording layer 52 grow on the first magnetic crystal grains. As a result, it is considered that magnetic crystal grains which are magnetically separated well are obtained, throughout the whole of the magnetic recording layer 50

Example 3

Layers up to the MgO seed layer 40 were formed in accordance with the same procedure as Example 1.

Next, the stacked body in which the seed layer 40 had been formed was heated to a temperature of 450° C., and then first FePt—C first magnetic recording layer 51a having a thickness of 2 nm was formed by a DC magnetron sputtering method using a target containing $Fe_{50}Pt_{50}$ and C in Ar gas at a pressure of 1.5 Pa. Here, the composition of the $Fe_{50}Pt_{50}$—C target was adjusted such that the obtained first magnetic recording layer 51a had a composition of 60% by volume of $Fe_{50}Pt_{50}$ and 40% by volume of C. The applied DC power was 40 W.

Next, FePt—ZnO second magnetic recording layer 52 having a thickness of 1 nm was formed by a DC magnetron sputtering method using a target containing $Fe_{50}Pt_{50}$ and ZnO in Ar gas at a pressure of 1.5 Pa, in the state that the stacked body was heated at a temperature of 450° C. Here, the composition of the $Fe_{50}Pt_{50}$—ZnO target was adjusted such that the obtained second magnetic recording layer 52 had a composition of 60% by volume of $Fe_{50}Pt_{50}$ and 40% by volume of ZnO. The applied DC power was 40 W.

Next, the stacked body in which the FePt—ZnO second magnetic recording layer 52 had been formed was heated to a temperature of 450° C., and then second FePt—C first magnetic recording layer 51b having a thickness of 2 nm was formed by a DC magnetron sputtering method using a target containing $Fe_{50}Pt_{50}$ and C in Ar gas at a pressure of 1.5 Pa. Here, the composition of the $Fe_{50}Pt_{50}$—C target was adjusted such that the obtained second first magnetic recording layer 51b had a composition of 60% by volume of $Fe_{50}Pt_{50}$ and 40% by volume of C. The applied DC power was 40 W.

Next, Pt protective layer 60 having a thickness of 5 nm was formed by a DC magnetron sputtering method using a Pt target in Ar gas at a pressure of 0.3 Pa and at the substrate temperature of 25° C., to obtain a magnetic recording medium.

Magnetic properties of the obtained magnetic recording medium were measured in accordance with the same procedure as Example 1. The obtained M-H hysteresis loop was shown in FIG. 8. The magnetic recording medium of this example had the saturation magnetization Ms of 697 emu/cm$^3$ (697 A/mm), the coercive force of 22.9 kOe (1820 A/mm), the α value of 0.59, the squareness ratio Mr/Ms (the ratio of residual magnetization Mr to saturation magnetization Ms) of 0.89, and a net magnetic anisotropy constant of the magnetic crystal grains Ku_grain of $2.56 \times 10^7$ erg/cm$^3$ ($2.56 \times 10^6$ J/m$^3$), in the perpendicular direction.

Example 4

A magnetic recording medium was obtained by repeating the procedure of Example 3, except that the thickness of the FePt—ZnO second magnetic recording layer 52 was changed to 0.5 nm.

Magnetic properties of the obtained magnetic recording medium were measured in accordance with the same procedure as Example 1. The magnetic recording medium of this example had the saturation magnetization Ms of 709 emu/cm$^3$ (709 A/mm), the coercive force of 25.0 kOe (1990 A/mm), the α value of 0.58, the squareness ratio Mr/Ms of 0.85, and a net magnetic anisotropy constant of the magnetic crystal grains Ku_grain of $3.39 \times 10^7$ erg/cm$^3$ ($3.39 \times 10^6$ J/m$^3$), in the perpendicular direction.

Example 5

A magnetic recording medium was obtained by repeating the procedure of Example 3, except that the composition of the FePt—ZnO second magnetic recording layer 52 was changed to 80% by volume of $Fe_{50}Pt_{50}$ and 20% by volume of ZnO, by changing the composition of the $Fe_{50}Pt_{50}$—ZnO target.

Magnetic properties of the obtained magnetic recording medium were measured in accordance with the same procedure as Example 1. The magnetic recording medium of this example had the saturation magnetization Ms of 782 emu/cm$^3$ (782 A/mm), the coercive force of 24.4 kOe (1940 A/mm), the α value of 0.68, the squareness ratio Mr/Ms of 0.90, and a net magnetic anisotropy constant of the magnetic crystal grains Ku_grain of $3.13 \times 10^7$ erg/cm$^3$ ($3.13 \times 10^6$ J/m$^3$), in the perpendicular direction.

Example 6

Layers up to the MgO seed layer 40 were formed in accordance with the same procedure as Example 1.

Next, the stacked body was heated to a temperature of 450° C., and then FePt—C first magnetic recording layer 51 having a thickness of 2 nm was formed by a DC magnetron sputtering method using a target containing $Fe_{50}Pt_{50}$ and C in Ar gas at a pressure of 1.5 Pa. Here, the composition of the $Fe_{50}Pt_{50}$—C target was adjusted such that the obtained first magnetic recording layer 51 had a composition of 60% by volume of $Fe_{50}Pt_{50}$ and 40% by volume of C. The applied DC power was 40 W.

Subsequently, FePt—ZnO second magnetic recording layer 52 having a thickness of 1 nm was formed by a DC magnetron sputtering method using a target containing $Fe_{50}Pt_{50}$ and ZnO in Ar gas at a pressure of 1.5 Pa, in the state that the stacked body was heated at a temperature of 450° C. Here, the composition of the $Fe_{50}Pt_{50}$—ZnO target was adjusted such that the obtained second magnetic recording layer 52 had a composition of 60% by volume of $Fe_{50}Pt_{50}$ and 40% by volume of ZnO. The applied DC power was 40 W.

A magnetic recording layer having a total thickness of 11 nm in which four of the first magnetic recording layers and three of the second magnetic recording layers are alternately stacked, by alternately repeating the above-described deposition steps of the first magnetic recording layer 51 and the second magnetic recording layer 52.

Finally, Pt protective layer 60 having a thickness of 5 nm was formed by a DC magnetron sputtering method using a Pt target in Ar gas at a pressure of 0.3 Pa and at the substrate temperature of 25° C., to obtain a magnetic recording medium.

Magnetic properties of the obtained magnetic recording medium were measured in accordance with the same procedure as Example 1. The obtained M-H hysteresis loop was shown in FIG. 10. The magnetic recording medium of this example had the saturation magnetization Ms of 662 emu/cm$^3$ (662 A/mm), the coercive force of 20.2 kOe (1610 A/mm), the α value of 0.67, and a net magnetic anisotropy constant of the magnetic crystal grains Ku_grain of 1.98× 10$^7$ erg/cm$^3$ (1.97×10$^6$ J/m$^3$), in the perpendicular direction.

Example 7

A magnetic recording medium having the magnetic recording layer 50 of a total thickness of 20 nm in which seven of the first magnetic recording layers 51 and six of the second magnetic recording layer 52 are alternately stacked was obtained by repeating the procedure of Example 6, except that the number of repetition of the deposition steps of the first magnetic recording layers 51 and the second magnetic recording layers 52.

Magnetic properties of the obtained magnetic recording medium were measured in accordance with the same procedure as Example 1. The obtained M-H hysteresis loop was shown in FIG. 11. The magnetic recording medium of this example had the saturation magnetization Ms of 638 emu/cm$^3$ (638 A/mm), the coercive force of 15.5 kOe (1230 A/mm), the α value of 0.65, and a net magnetic anisotropy constant of the magnetic crystal grains Ku_grain of 1.26× 10$^7$ erg/cm$^3$ (1.26×10$^6$ J/m$^3$), in the perpendicular direction.

Comparative Example 4

Layers up to the first FePt—C first magnetic recording layer 51a were formed in accordance with the same procedure as Example 3.

Next, FePt magnetic layer having a thickness of 1 nm was formed by a DC magnetron sputtering method using a target containing Fe$_{50}$Pt$_{50}$ in Ar gas at a pressure of 1.5 Pa, in the state that the stacked body was heated at a temperature of 450° C. The DC power applied was 40 W.

Subsequently, the second FePt—C first magnetic recording layer 51b having a thickness of 2 nm and the Pt protective layer 60 having a thickness of 5 nm were formed in accordance with the same procedure as Example 3, to obtain a magnetic recording medium.

Figure 9:
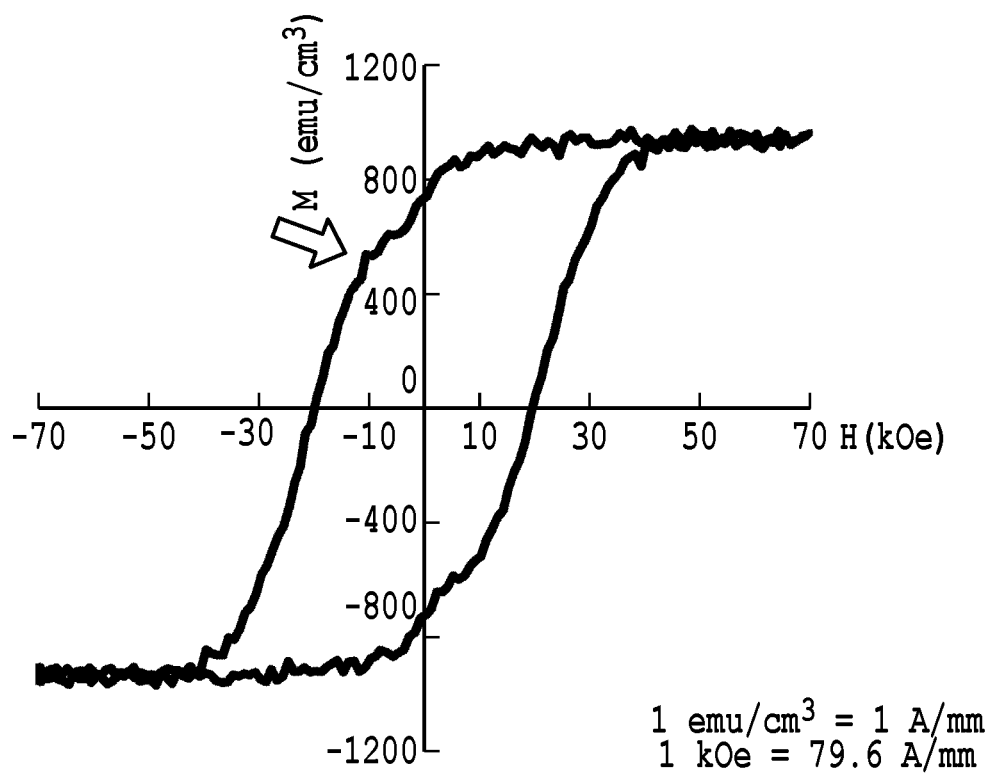
FIG. 9 shows an M-H hysteresis loop in the perpendicular direction of the magnetic recording medium of Comparative Example 4.

Magnetic properties of the obtained magnetic recording medium were measured in accordance with the same procedure as Example 1. The obtained M-H hysteresis loop was shown in FIG. 9. The magnetic recording medium of this example had the saturation magnetization Ms of 933 emu/cm$^3$ (933 A/mm), the coercive force of 19.9 kOe (1580 A/mm), and the squareness ratio Mr/Ms of 0.78. Besides, the α value and the net magnetic anisotropy constant of the magnetic crystal grains Ku_grain could not be measured due to the shoulder of the M-H hysteresis loop shown in FIG. 9. (Evaluation 3)

Figure 8:
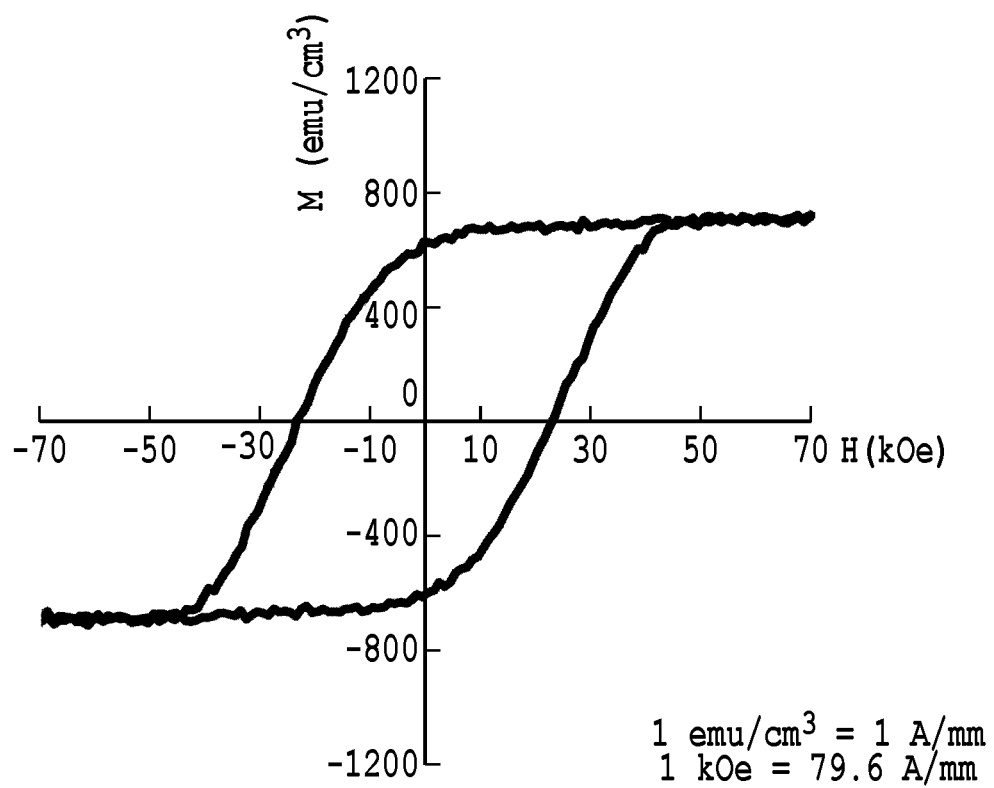
FIG. 8 shows an M-H hysteresis loop in the perpendicular direction of the magnetic recording medium of Example 3.

As shown in FIG. 8, the magnetic recording medium of Example 3 comprising the FePt—ZnO second magnetic recording layer 52 having a thickness of 1 nm exhibited the smooth M-H hysteresis loop without any shoulders. Similarly, the magnetic recording medium of Example 4 comprising the FePt—ZnO second magnetic recording layer 52 having a thickness of 0.5 nm also exhibited the smooth M-H hysteresis loop without any shoulders. These results mean that the FePt magnetic crystal grains in the magnetic recording layer 50 are magnetically separated well. On the other hand, there is a step indicated with an arrow in the M-H hysteresis loop of the magnetic recording medium of Comparative Example 4 shown in FIG. 9. This result means that magnetic separation among the FePt magnetic crystal grains is insufficient. In view of these results, it is understood that, the FePt—ZnO second magnetic recording layer 52 disposed between two of the FePt—C first magnetic recording layers 51a and 51b can promote not only the columnar growth of the FePt magnetic crystal grains but also the magnetic separation among the FePt magnetic crystal grains. Further, the magnetic recording media of Examples 3 and 4 had a large coercive force Hc, a good α value, and a large value of Ku_grain.

Figure 10:
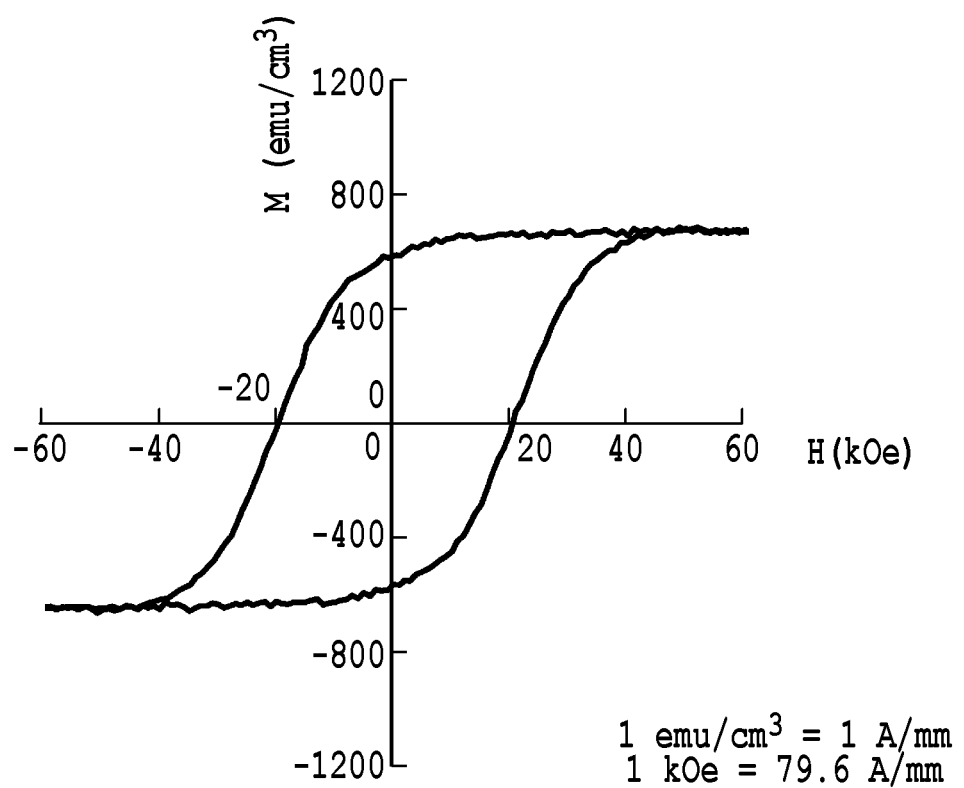
FIG. 10 shows an M-H hysteresis loop in the perpendicular direction of the magnetic recording medium of Example 6.
Figure 11:
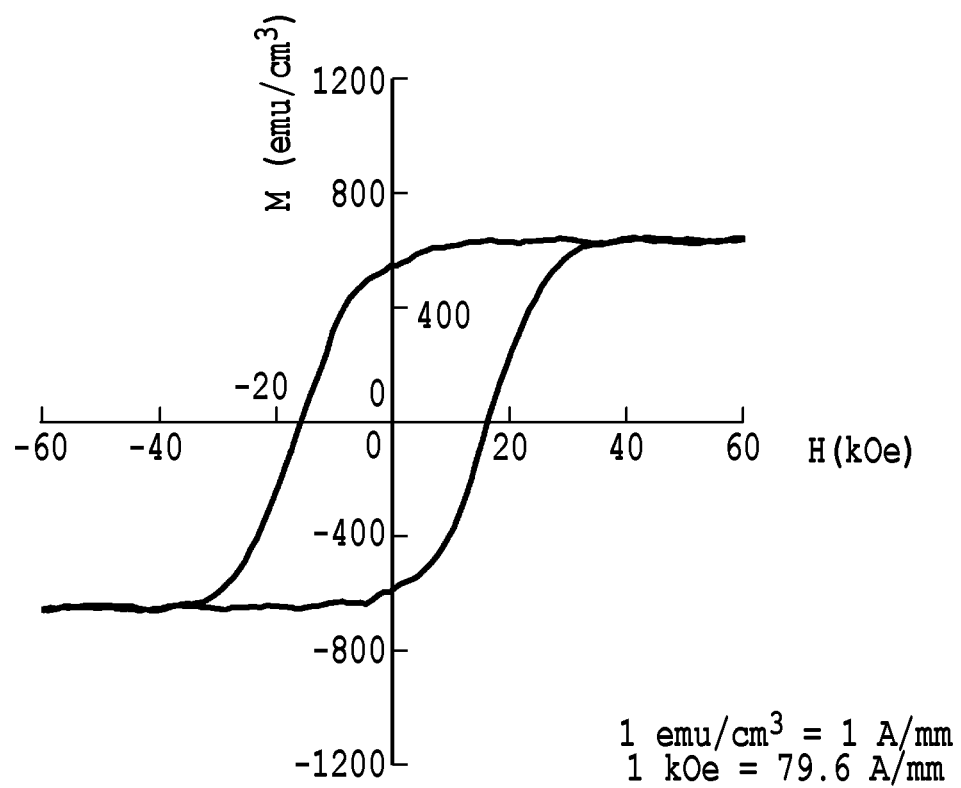
FIG. 11 shows an M-H hysteresis loop in the perpendicular direction of the magnetic recording medium of Example 7.

Furthermore, the magnetic recording media of Examples 5 and 6, in which the number of alternate deposition of the FePt—C first magnetic recording layers 51 and the FePt—ZnO second magnetic recording layers 52 is increased, exhibited smooth M-H hysteresis loops without any shoulders, as shown in FIGS. 10 and 11. Further, the magnetic recording media of Examples 5 and 6 had a large coercive force Hc, a good α value, and a large value of Ku_grain. In view of these result, it is understood that, alternate depositing of the FePt—C first magnetic recording layer 51 and the FePt—ZnO second magnetic recording layer 52 make it possible not only to the thickness of the magnetic recording layer 50 can be increased, but also to promote the columnar growth of the FePt magnetic crystal grains and the magnetic separation among the FePt magnetic crystal grains.

Besides, the magnetic recording medium of Example 5, in which the content of ZnO is decreased, exhibited a smooth M-H hysteresis loop without any shoulders, similarly to the magnetic recording medium of Example 3. Further, the magnetic recording medium of Example 5 had a large coercive force Hc, a good α value, and a large value of Ku_grain. In view of these results, it is understood that not only the columnar growth of the FePt magnetic crystal grains but also the magnetic separation among the FePt magnetic crystal grains can be promoted by disposing the FePt—ZnO second magnetic recording layer 52 containing 20% of ZnO, without necessity to make the content of the non-magnetic segregant in the first magnetic recording layer 51 coincide with the content of the non-magnetic segregant in the second magnetic recording layer 52.

REFERENCE SIGNS LIST

10 Non-magnetic substrate
20 Adhesive layer
30 Interlayer
40 Seed layer
50 Magnetic recording layer
51, 51a, 51b First magnetic recording layer
52 Second magnetic recording layer
60 Protective layer

The invention claimed is:

1. A perpendicular magnetic recording medium comprising a non-magnetic substrate and a magnetic recording layer, wherein:
the magnetic recording layer consists essentially of one or more first magnetic layers and one or more second magnetic layers;
the one or more first magnetic layers are odd-numbered layers from the non-magnetic substrate;

the one or more second magnetic layers are even-numbered layers from the non-magnetic substrate;

the one or more first magnetic layers have a granular structure comprising first magnetic crystal grains comprising an ordered alloy and a first non-magnetic segregant surrounding the first magnetic crystal grains and comprising carbon;

the one or more second magnetic layers have a granular structure comprising second magnetic crystal grains comprising an ordered alloy and a second non-magnetic segregant surrounding the second magnetic crystal grains and comprising Zn and O; and the magnetic recording layer has a total thickness of 5 nm or more.

2. The magnetic recording medium according to claim 1, wherein the magnetic recording layer has a two-layered structure consisting of one of the first magnetic layers and one of the second magnetic layers.

3. The magnetic recording medium according to claim 1, wherein the magnetic recording layer has a three-layered structure consisting of two of the first magnetic layers and one of the second magnetic layers.

4. The magnetic recording medium according to claim 3, wherein the ordered alloy in the first magnetic layer is FePt, the first non-magnetic segregant is carbon, the ordered alloy in the second magnetic layer is FePt, and the second non-magnetic segregant is ZnO.

5. The magnetic recording medium according to claim 1, wherein the second non-magnetic segregant constitutes 10% by volume or more and 50% by volume or less of the second magnetic layer.

6. The magnetic recording medium according to claim 5, wherein the ordered alloy of the first magnetic layers and the ordered alloy of the second magnetic layers are an alloy comprising at least one element selected from the group consisting of Fe and Co, and at least one element selected from the group consisting of Pt, Pd, Au and Ir.

7. The magnetic recording medium according to claim 6, wherein the ordered alloy of the first magnetic layers and the ordered alloy of the second magnetic layers are selected from the group consisting of FePt, CoPt, FePd and CoPd.

8. The magnetic recording medium according to claim 1, wherein the first magnetic layers have a thickness of 0.5 to 4 nm, and the second magnetic layers have a thickness of 1 to 20 nm.

9. The magnetic recording medium according to claim 1, wherein the first magnetic crystal grains and the second magnetic crystal grains are composed from the same constituent elements.

10. The magnetic recording medium according to claim 1, further comprising one or more layers selected from a heat sink layer, an adhesive layer, a soft-magnetic under layer, an interlayer, and a seed layer.

11. The magnetic recording medium according to claim 1, wherein the first magnetic layers have a thickness in a range from 1 nm to 2 nm.

* * * * *